United States Patent [19]

Smith

[11] Patent Number: 5,056,136

[45] Date of Patent: Oct. 8, 1991

[54] SECURE VIDEO COMMUNICATIONS SYSTEM

[75] Inventor: Robert L. Smith, Idaho Falls, Id.

[73] Assignee: The United States of America as represented by the United States Department of Energy, Washington, D.C.

[21] Appl. No.: 490,892

[22] Filed: Mar. 9, 1990

[51] Int. Cl.$^5$ ............................................. H04N 7/167
[52] U.S. Cl. ........................................ 380/10; 370/62; 379/202; 379/53; 358/85
[58] Field of Search ..................... 370/62; 379/202, 53; 358/85; 380/10

[56] References Cited

U.S. PATENT DOCUMENTS

| | | | |
|---|---|---|---|
| 4,686,698 | 8/1987 | Tompkins et al. | 358/85 |
| 4,710,917 | 12/1987 | Tompkins et al. | 379/53 |
| 4,734,765 | 3/1988 | Okada et al. | 379/53 |
| 4,893,326 | 1/1990 | Duran et al. | 358/85 |
| 4,924,311 | 5/1990 | Ohki et al. | 358/85 |
| 4,935,953 | 6/1990 | Appel et al. | 358/85 |

Primary Examiner—Thomas H. Tarcza
Assistant Examiner—David Cain
Attorney, Agent, or Firm—Tyrone Davis; Robert J. Fisher; William R. Moser

[57] ABSTRACT

A secure video communications system having at least one command network formed by a combination of subsystems. The combination of subsystems to include a video subsystem, an audio subsystem, a communications subsystem, and a control subsystem. The video communications system to be window driven and mouse operated, and having the ability to allow for secure point-to-point real-time teleconferencing.

16 Claims, 2 Drawing Sheets

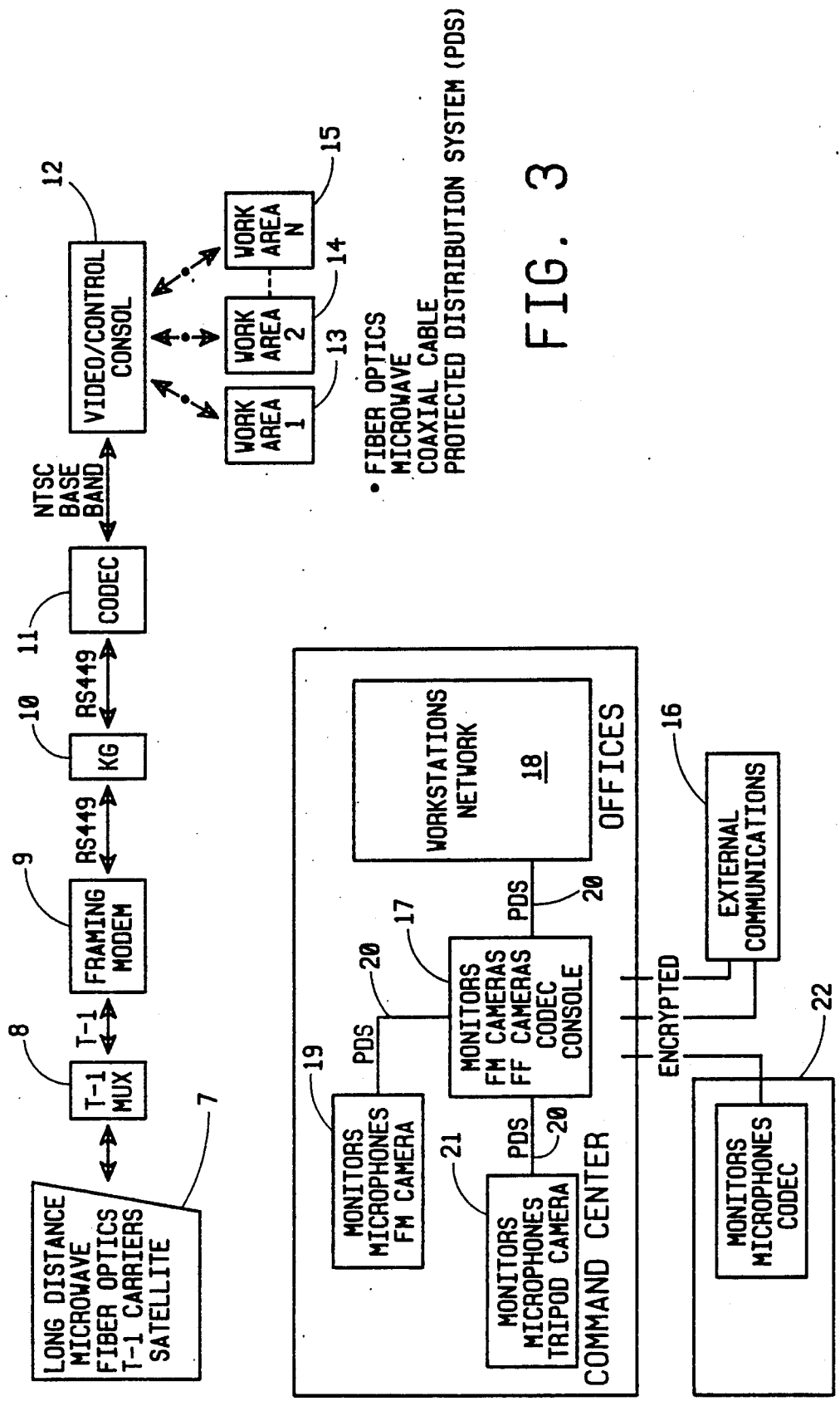

SECURE VIDEO COMMUNICATIONS SYSTEM

The United States Government has rights in this invention pursuant to Contract No. DE-AC07-76ID01570 between the United States Department of Energy and EG&G Idaho, Inc.

BACKGROUND OF THE INVENTION

The present invention relates to a communications system and in particular, to a system for the integration of a multimedia, secure communications system that includes high quality, real-time, full motion or freeze frame video, full duplex audio, and digital data communications for teleconferencing.

A variety of communications systems have been developed wherein the user has the ability to see and hear information on a real-time basis.

Typically these systems required that the equipment used be specifically that of the system package and did not allow for the interchanging of equipment nor compatibility with existing audio and video equipment already on hand. Also, these systems did not allow real-time, full motion, or freeze frame capabilities without the designation of a full-time or permanent control center to direct or redirect signals to the different locations. Moreover, systems that did allow for multiple direction were often cumbersome and complex requiring extensive training to operate.

SUMMARY OF THE INVENTION

The present invention is a communications system having the integration of a multimedia, secure communications system that includes high quality, real-time, full motion or freeze frame video, full duplex audio, and digital data communications for teleconferencing.

The invention includes communications, video, audio, and control subsystems. Each subsystem design is nonhomogeneous tailored to the requirements of the particular installation and its existing equipment. Each subsystem is functional and the specific selection of additional equipment is based upon functional requirements, existing logistical support, and facility configuration. Studio quality equipment is employed to provide each subsystem with a high level of performance and quality appearance.

It is therefore an object of the invention to provide a communications system having the ability to allow real-time, point-to-point teleconferencing, including system wide command control of multiple video and audio signals.

Another object of the invention is to provide a communications system having the ability to store predetermined conferencing configurations and recall the configurations when required.

Yet another object of the invention is to provide a mouse operated, user friendly control system for a communications system.

To achieve the foregoing and other objects and in accordance with the purpose of the present invention, as embodied and broadly described herein, the invention may comprise a plurality of command networks wherein each command network has a communications subsystem, an audio subsystem, a video subsystem, and a control subsystem, including a computer and software to provide a common-user interface mode incorporating a mouse.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form part of the specification, illustrate an embodiment of the present invention and together with the description, serve to explain the principles of the invention. In the drawings:

FIG. 3 shows a flow chart of one half of the command networks communication configuration for a two way point-to-point link; and FIG. 4 shows a block diagram of a command network, with the integration of a work station network and the addition of a secure remote site according to the preferred embodiment of the invention.

DETAILED DESCRIPTION OF THE INVENTION

Figure 1:
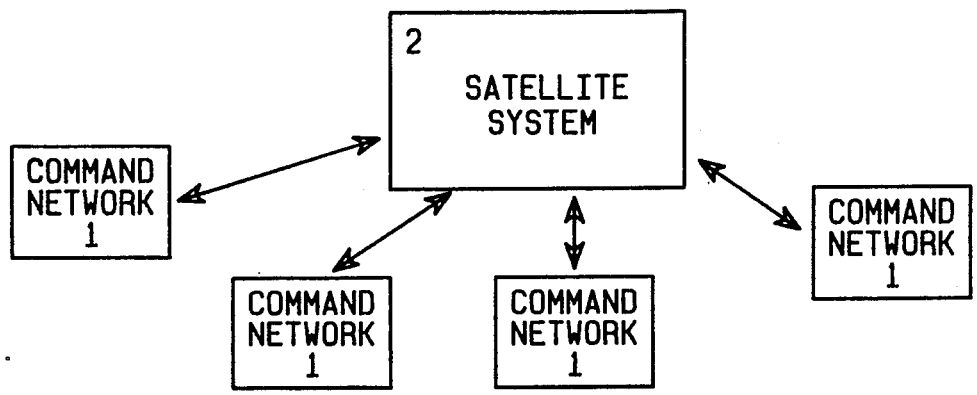
FIG. 1 shows a block diagram of a video communications system according to an embodiment of the invention.
Figure 2:
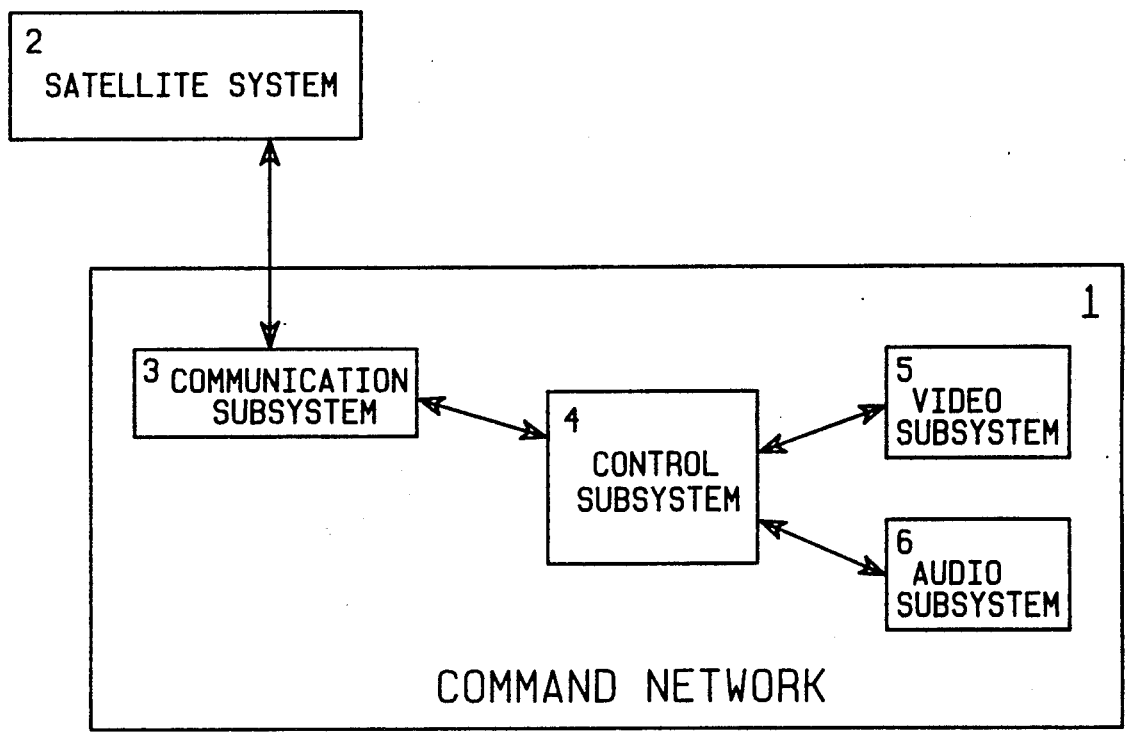
FIG. 2 shows a block diagram of a command network in FIG. 1.

Referring to FIGS. 1 and 2, the video communications system embodying the invention provides several command networks 1, each having the integral components of a communications subsystem 3, a control subsystem 4, a video subsystem 5, and an audio subsystem 6. These command networks receive and transmit audio, video, and data signals routed through either long distance, satellite, microwave, T-1 carriers, and fiber optic systems 2. The communications subsystem 3 provides the transfer of secure compressed video, audio, and data transmissions between network locations. Specific details of the communications subsystem are dependant on the facility maintenance and support requirements of each location.

In FIG. 2 there is a block diagram showing a control subsystem 4 receiving and sending signals to the audio subsystem 6, video subsystem 5, and the communications subsystem 3. The control subsystem 4 includes the use of an IBM-compatible PC or the like to provide a common-user interface for all the components of the invention. A manual-control override on each component is also provided. The computer control simplifies the operation with menus and icons, and with additional features not provided in conventional systems.

The computer system uses "Microsoft Windows" software, a trademark of "Microsoft Corporation", as a user interface. The system can be configured to be icon or menu bar driven. The interface runs as a Windows task and is controlled by a mouse. Since many users are already familiar with the operation of software of this type, operator training is minimized. It further allows for easy indexing and storing of configurations. Where a configuration is the grouping of audio and video settings at a particular command network.

As will be appreciated, the Windows system provides individual dialog screens for configurations, video switching, coder/decoder (CODEC) control, audio switching/mixing, camera control, and still video recorder control. Additional features are provided for security mode switching. The interface is easily expanded and screens can be added or changed as needed.

In FIG. 3 there is shown one half of the signal flow of a typical configuration for a two-way, point-to-point link to each command network. Each corresponding command network location has a duplicate set of equipment. The long-distance carrier 7 (microwave, satellite, fiber optics, or other suitable carrier) provides a T-1 link 8 between sites. On one side of the link the T-1 signal is received and stripped of the framing data by a framing modem 9 and converted to an RS449 signal. The RS449 signal is decrypted by the encrypting/decrypting device 10 and passed to the Coder/Decoder 11 (CODEC). The CODEC 11 converts the RS449 compressed signal to base-band video, audio, and data signals, and sends these signals to a video/control console 12. Between all these devices, (depending on the line length and facility requirements) additional modems may be used, particularly where facilities utilize fiber links to provide isolation from external links. This process is reversed for signals sent from the command network.

FIG. 4 shows a block diagram of another embodiment of a command network incorporating a remote site 22. Signals enter and are transmitted by external communications 16 through transmission lines to the video/control console 17. These signals are received and transmitted from the work stations 18, and production sites 19, and 21. Each production site has monitors, microphones, and cameras which enable the controller to allow teleconferencing to be conducted at each production site. The present embodiment uses protected distribution systems (PDS) lines 20 as the method of secure internal transmission. All external signals received and transmitted by the video/control console 17 are encrypted and decrypted then sent to a CODEC located at the video/control console 17. The information received and transmitted by the remote site 22 also is encrypted/decrypted and requires an additional CODEC to be present at the remote site 22.

In the preferred embodiment of the invention the control system 4 includes, an IBM PC-compatible AT or 386 with CGA or better monitor. The computer must support the "Microsoft Windows" software with a 1-2 MB memory, 20 Meg hard disk and a 1.2 MB floppy disk, provide mouse support and have at least two spare slots. Additionally, the computer system incorporates an RS422 control system to provide discrete control of various system components. This network controls the mutes, camera pan/tilt and zoom/focus, security switches, video speaker switches, and computer monitor switches. Various communications ports are used to control devices such as audio and video switchers, CODEC and still video recorders (SVR).

Each device is actually controlled separately, but always through the same graphically-oriented interface. The interface treats individual devices as functions, allowing the operator to concentrate on the task, not the device. The labeling and organization of dialog boxes are site specific. Each facility decides how they want the interface to work. As devices are changed or added, the interface remains consistent, only affected tasks are changed. The interface also allows audio signals to be forced to follow a designated video signal.

The video subsystem includes standard video equipment such as cameras, VCRs, SVRs, monitors, and large screen projectors. To make the system trouble-free and easy to use, video switchers, time-based correctors, distribution amplifiers, and sync generators can also be used. Studio-quality video equipment provides the best performance in this environment.

The audio subsystem includes very specialized equipment to satisfy the difficult room environments at production sites. Audio switchers, microphones, equalizers, and mixers can be used so that personnel not specifically trained in audio technology can operate the system. There are also special muting functions added so that an operator using the computer can control the configuration of the audio system.

The primary component of the communications subsystem is the CODEC. This component allows conversion of signals to appropriate frequency and bandwith for transmission and reception by the control subsystem. Modems, multiplexers, and encryption/decrytion devices are also used to distribute, protect, and route the signals between sites.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A secure video communications system having at least one command network, each of said command networks comprising:

a video subsystem, an audio subsystem, and a control subsystem;

said control subsystem having means providing a common-user interface mode, including means for linking said command networks allowing access to and operation of said audio and video subsystems of other command networks, manual operating means of said audio and video subsystems, security means for encrypting and decrypting audio, video, and data signals, and a manual override for said audio and video subsystems;

said video subsystem having means for allowing control and transmission of multiple video signals, by using said manual operating means to select a source of said video signals, to add or remove the destination of said video signals, and to activate or cancel any signal transmitted to said control subsystem;

said audio subsystem having means for allowing control and transmission of multiple audio signals, by using said manual operating means to mute said audio signals, and to activate or cancel sound transmitted to said control subsystem; and said control subsystem having indexing means associated with each command network for receiving said audio and video signals and having the ability to designate and store a configuration of the video to audio signals and the ability to retrieve different configurations, and wherein said indexing means can index said configuration and said configuration can be recalled by name by said manual operating means.

2. A secure video communications system, as recited in claim 1, wherein:

said video subsystem includes a camera, a video tape recorder, a still video recorder, a monitor, a video switcher, a digital time-based corrector, and a sync generator; and said manual operating means includes a mouse for activating and canceling said audio, video, and data signals.

3. A secure video communications system, as recited in claim 2, wherein:

said audio subsystem includes, an audio switcher, a mixer, a speaker system, and a graphic equalizer.

4. A secure video communications system, as recited in claim 3 wherein:

said control subsystem includes a communications port having the ability to control said audio switcher and said video switcher.

5. A secure video communications system, consisting of a plurality of command networks:

each of said command networks having a communications subsystem, an audio subsystem, a video subsystem, and a control subsystem; and said control subsystem having means to provide a common-user interface mode, thereby allowing multiple access and operation of said audio and video subsystems from each of said command networks including a manual operating means, of said audio and video subsystems, and a manual override for said audio and video subsystems.

6. A secure video communications system, as recited in claim 5, wherein:

said command network having means to interact and send audio, video, and data signals to each command network and having the ability to receive signals from two or more sources; and said control subsystem having means for creating or retrieving a configuration and generating a menu for said audio and video subsystems, and wherein said manual operating means includes a mouse to preset said configuration and execute commands to said audio and video subsystems.

7. A secure video communications system, as recited in claim 6, wherein:

said control subsystem includes means for forcing an audio signal to follow a designated video signal to said command network.

8. A secure video communications system as recited in claim 7, wherein:

said video subsystem includes a camera, a video tape recorder, a still video recorder, a monitor, a video switcher, a digital time-based corrector, and a sync generator.

9. A secure video communications system, as recited in claim 8, wherein:

said audio subsystem includes, an audio switcher, a mixer, a speaker system, and a graphic equalizer.

10. A secure video communications system, as recited in claim 9, wherein:

said control subsystem includes a communications port having the ability to control said audio switcher and video switcher; and said communications subsystem having security means for encrypting and decrypting audio, video, and data signals.

11. A video communications system, as recited in claim 10, wherein:

said mouse allows control of the video signals' brightness, contrast, color, and tint.

12. A secure video communications system, as recited in claims 4, or 11 wherein:

said control subsystem includes a means to generate an icon activated by said mouse.

13. A secure video communications command network comprising:

a video subsystem, an audio subsystem, and a control subsystem;

said control subsystem having means providing a common-user interface mode, including means for linking other command networks allowing access to and operation of said audio and video subsystems of each said command networks, manual operating means of said audio and video subsystems, security means for encrypting and decrypting audio, video, and data signals, and a manual override for said audio and video subsystems;

said video subsystem having means for allowing control and transmission of multiple video signals, by using said manual operating means to select a source of said video signals, to add or remove the destination of said video signals, and to activate or cancel any signal transmitted to said control subsystem;

said audio subsystem having means for allowing control and transmission of multiple audio signals, by using said manual operating means to mute said audio signals, and to activate or cancel sound transmitted to said control subsystem; and said control subsystem having indexing means associated with each command network for receiving said audio and video signals and having the ability to designate and store a configuration of the video to audio signals and the ability to retrieve different configurations, and wherein said indexing means can index said configuration and said configuration can be recalled by name by said manual operating means.

14. A secure video communications command network as recited in claim 13, wherein:

said video subsystem includes a camera, a video tape recorder, a still video recorder, a monitor, a video switcher, a digital time-based corrector, and a sync generator; and said manual operating means includes a mouse for activating and canceling said audio, video, and data signals.

15. A secure video communications command network as recited in claim 14, wherein:

said audio subsystem includes, an audio switcher, a mixer, a speaker system, and a graphic equalizer.

16. A secure video communications command network as recited in claim 15 wherein:

said control subsystem includes a communications port having the ability to control said audio switcher and said video switcher.

* * * * *